No. 863,800. PATENTED AUG. 20, 1907.
H. W. LANDROCK.
CAR WHEEL OIL CHAMBER COVER.
APPLICATION FILED MAY 17, 1907.
Fig. 1.
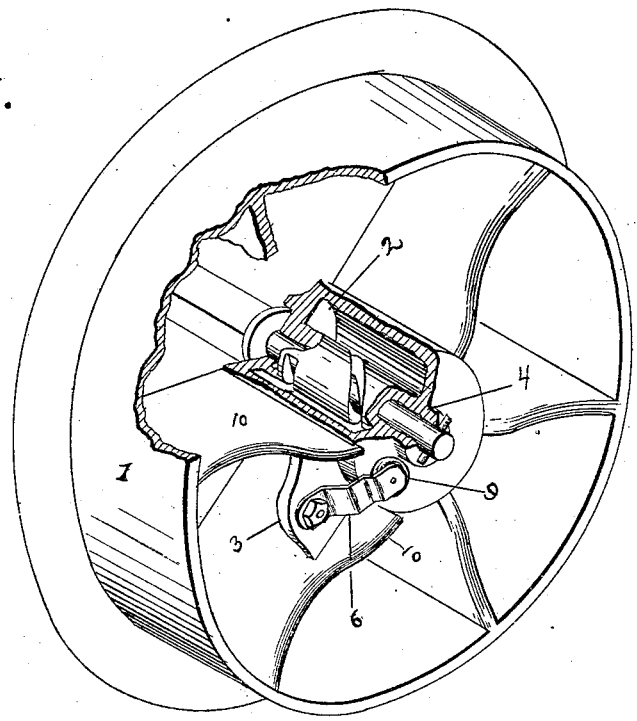
Fig. 2.
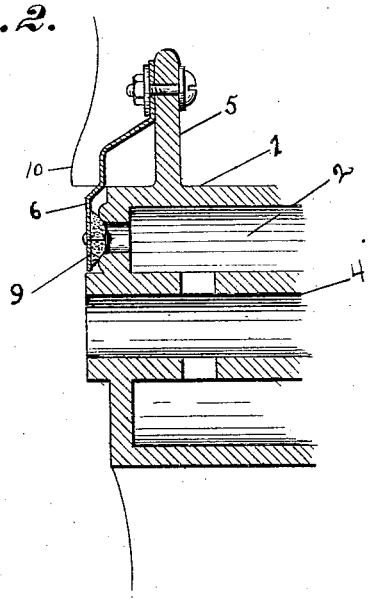
Fig. 3.
Fig. 4.
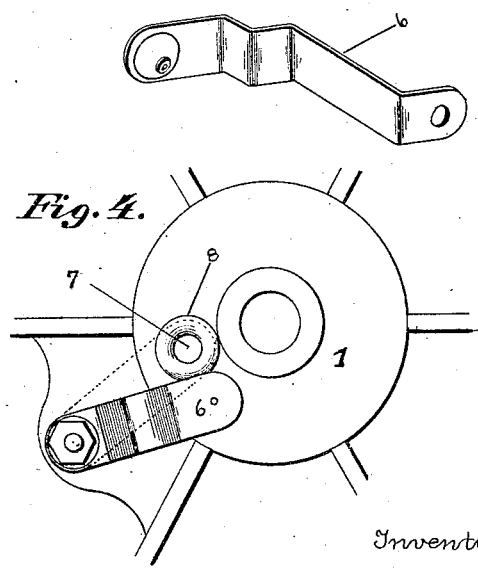
Witnesses
Harry C. Rastetter
Sylvia Boron
Inventor
Harmon W. Landrock,
By F. W. Bond
Attorney

UNITED STATES PATENT OFFICE.

HARMON W. LANDROCK, OF CANAL FULTON, OHIO.

CAR-WHEEL OIL-CHAMBER COVER.

No. 863,800.  Specification of Letters Patent.  Patented Aug. 20, 1907.

Application filed May 17, 1907. Serial No. 374,284.

*To all whom it may concern::*

Be it known that I, HARMON W. LANDROCK, a citizen of the United States, residing at Canal Fulton, in the county of Stark and State of Ohio, have invented certain new and useful Improvements in Car-Wheel Oil-Chamber Covers; and I do hereby declare that the following is a full, clear, and exact description of the same, reference being had to the annexed drawing, making a part of this specification, and to the numerals and figures of reference marked thereon, in which—

Figure 1 is a perspective view showing a portion of a car wheel, its axle and illustrating the cover or cap placed in position to retain the oil. Fig. 2 is a section of the axle wheel hub showing the cap or cover placed in position to retain the oil. Fig. 3 is a detached view of the cap or cover carrying arm. Fig. 4 is a view showing a portion of the wheel and the cap or cover removed.

The present invention has relation to a car wheel oil chamber cover, and it consists in the novel arrangement hereinafter described and particularly pointed out in the claims.

Similar numerals of reference indicate corresponding parts in all the figures of the drawing.

In the accompanying drawing, 1 represents the car wheel which may be of any desired construction and is provided with the oil chamber 2, and for the purpose of better distributing the oil the curved slots are provided, which lead to the axle bearing 4, these parts however are common and form no particular part of the present invention, but are shown conventionally.

To the hub of the wheel 1 is attached or formed integral therewith the flange 5, to which flange is pivotally attached the spring arm 6, which spring arm is substantially of the form shown in the drawings. In the end of the hub of the wheel 1 is located the oil aperture 7, which leads to the oil chamber 2 and for the purpose hereinafter described. The oil aperture is surrounded by the rib 8, which rib is set out a short distance from the end of the hub of the axle wheel 1. To the spring arm 6 is attached the gasket 9, which gasket is preferably formed of rubber or other pliable material. The gasket 9 is curved upon its outer surface and is so formed for the purpose of partially entering the oil aperture 7 as best illustrated in Fig. 2 by which arrangement the oil is held in the chamber 2 when the gasket 9 is brought into the position illustrated in Fig. 2. The spring arm 6 is so formed that it will press the gasket toward the hub of the wheel 1 so as to snugly hold the gasket in proper contact with the flange 8.

For the purpose of preventing any accidental displacement of the spring arm 6 and its gasket 9, the spokes 10 located upon the opposite sides of the oil apertures 7 are extended a short distance beyond the end of the hub of the wheel 1 by which arrangement said spokes form a protection for the spring and prevent anything from coming in contact with the spring arm during the time the car is moved back and forth upon the track. When it is desired to open the aperture the spring arm is moved upon its pivotal point and when it is desired to close the aperture the spring arm is brought into its normal position.

Having fully described my invention what I claim as new and desire to secure by Letters Patent, is—

The combination of a wheel and hub provided with an oil chamber, passages leading from the oil chamber to the bearing of the hub, and an oil aperture provided with a bead or flange extended beyond the end of the aperture, a spring arm provided with a gasket having a curved surface, a flange adapted to carry the spring arm, the spokes of the wheel upon opposite sides of the aperture being extended beyond the end of the hub, substantially as and for the purpose specified.

In testimony that I claim the above, I have hereunto subscribed my name in the presence of two witnesses.

HARMON W. LANDROCK.

Witnesses:
 MESSUS OLIVER,
 GEORGE FELLMETH.